(12) United States Patent
Fletcher et al.

(10) Patent No.: US 7,208,711 B2
(45) Date of Patent: Apr. 24, 2007

(54) DIELECTRIC WELDING METHODS AND APPARATUS

(75) Inventors: R. David Fletcher, Surrey (CA); Christopher Lawrence Clarke, Vancouver (CA)

(73) Assignee: Coolhead Technologies, Inc., Delta (CA)

( * ) Notice: Subject to any disclaimer, the term of this patent is extended or adjusted under 35 U.S.C. 154(b) by 43 days.

(21) Appl. No.: 11/128,277

(22) Filed: May 13, 2005

(65) Prior Publication Data

US 2005/0252896 A1 Nov. 17, 2005

Related U.S. Application Data

(60) Provisional application No. 60/570,817, filed on May 14, 2004.

(51) Int. Cl.
*H05B 6/08* (2006.01)
(52) U.S. Cl. ......................... 219/765; 219/767
(58) Field of Classification Search ............... 219/765, 219/603, 633, 766, 767, 768, 769, 764
See application file for complete search history.

(56) References Cited

U.S. PATENT DOCUMENTS

| | | | | |
|---|---|---|---|---|
| 4,451,721 A | * | 5/1984 | Nemeskeri | 219/769 |
| 4,778,556 A | * | 10/1988 | Wery et al. | 156/379.6 |
| 5,196,999 A | * | 3/1993 | Abe | 700/90 |
| 6,888,088 B2 | * | 5/2005 | Bolton et al. | 219/76.1 |
| 2005/0023253 A1 | * | 2/2005 | Houston et al. | 219/121.11 |

* cited by examiner

*Primary Examiner*—Daniel Robinson
(74) *Attorney, Agent, or Firm*—Oyen Wiggs Green & Mutala LLP

(57) ABSTRACT

Dielectric welding apparatus has opposed electrodes that can be engaged on either side of a product to be welded and a dielectric welding power supply that supplies welding potentials to the electrodes. The apparatus includes electrically insulating buffer material adjacent to at least one of the electrodes. A recess formed in a surface of the buffer material receives an end of an electrically-conductive member in the product. The buffer material prevents arcing between the electrodes and the electrically-conductive member.

19 Claims, 14 Drawing Sheets

DIELECTRIC WELDING METHODS AND APPARATUS

TECHNICAL FIELD

This application claims the benefit under 35 U.S.C. §119 of U.S. patent application No. 60/570,817 filed on 14 May 2004 and entitled DIELECTRIC WELDING METHODS AND APPARATUS.

TECHNICAL FIELD

The invention relates to methods and apparatus for welding dielectric materials such as plastics. Some embodiments of the invention relate to welding using electromagnetic signals (e.g. radiofrequency signals). The invention may be applied to welding plastic membranes together in the presence of metals or other exposed electrically conductive materials (hereinafter referred to as ECM). The invention has broad application for manufacturing products which include welded plastic membranes that have ECM near to the weld locations.

BACKGROUND

Dielectric welding, also known as capacitance, radiofrequency, or high frequency welding, provides a way to fuse materials together. The resulting weld can be as strong as the original workpiece materials. Dielectric welding is commonly used for joining various plastic materials together.

In dielectric welding, an alternating electrical field (typically alternating at a high frequency) is applied across an area to be welded. This is typically done by applying a signal between electrodes. The signal creates a varying, high-frequency electromagnetic field. When a material which is a poor electrical conductor is exposed to such a field, heat is generated in the material. The heat results from electrical losses that occur in the material. The heat deposited in the material causes the temperature of the material to rise. The heated materials become fused together.

Dielectric welding relies on certain properties of the material in the parts being welded, for example, the geometry and dipole moments of molecules of the material, to cause the generation of heat in a rapidly alternating electromagnetic field. Not all materials can be dielectric welded. Polyvinyl chloride (PVC) is commonly welded by dielectric welding. Other thermoplastics that can be dielectric welded are EVA and polyurethanes.

A typical dielectric welding apparatus places materials to be joined between two electrodes, which are typically metal plates or bars. The electrodes are connected to an oscillator. The oscillator is turned on to heat the materials, which fuse together when they have been heated sufficiently. The electrodes may hold the materials together during heating and cooling.

There are situations where it is desirable to make products which have ECM, e.g. metal components, embedded in or attached to one or more membranes or other parts of a dielectric material which are to be welded together. A problem is that ECM in the vicinity of the electrodes of a dielectric welder can cause electrical discharges in the form of arcs or sparks. Such electrical discharges can damage the product being made, the welding apparatus and/or the dielectric welder itself. Electrical arcing can be dangerous to machines and humans.

It is not always possible or convenient to add ECM after welding has been completed. There is a need for methods and apparatus which may be used to perform dielectric welding in the vicinity of ECM.

SUMMARY OF THE INVENTION

The invention relates to methods and apparatus for welding plastic materials membranes together in the vicinity of electrically conductive materials.

Various aspects of the invention and features of specific embodiments of the invention are described below.

BRIEF DESCRIPTION OF THE DRAWINGS

In drawings which illustrate non-limiting embodiments of the invention.

DESCRIPTION

Figure 1:
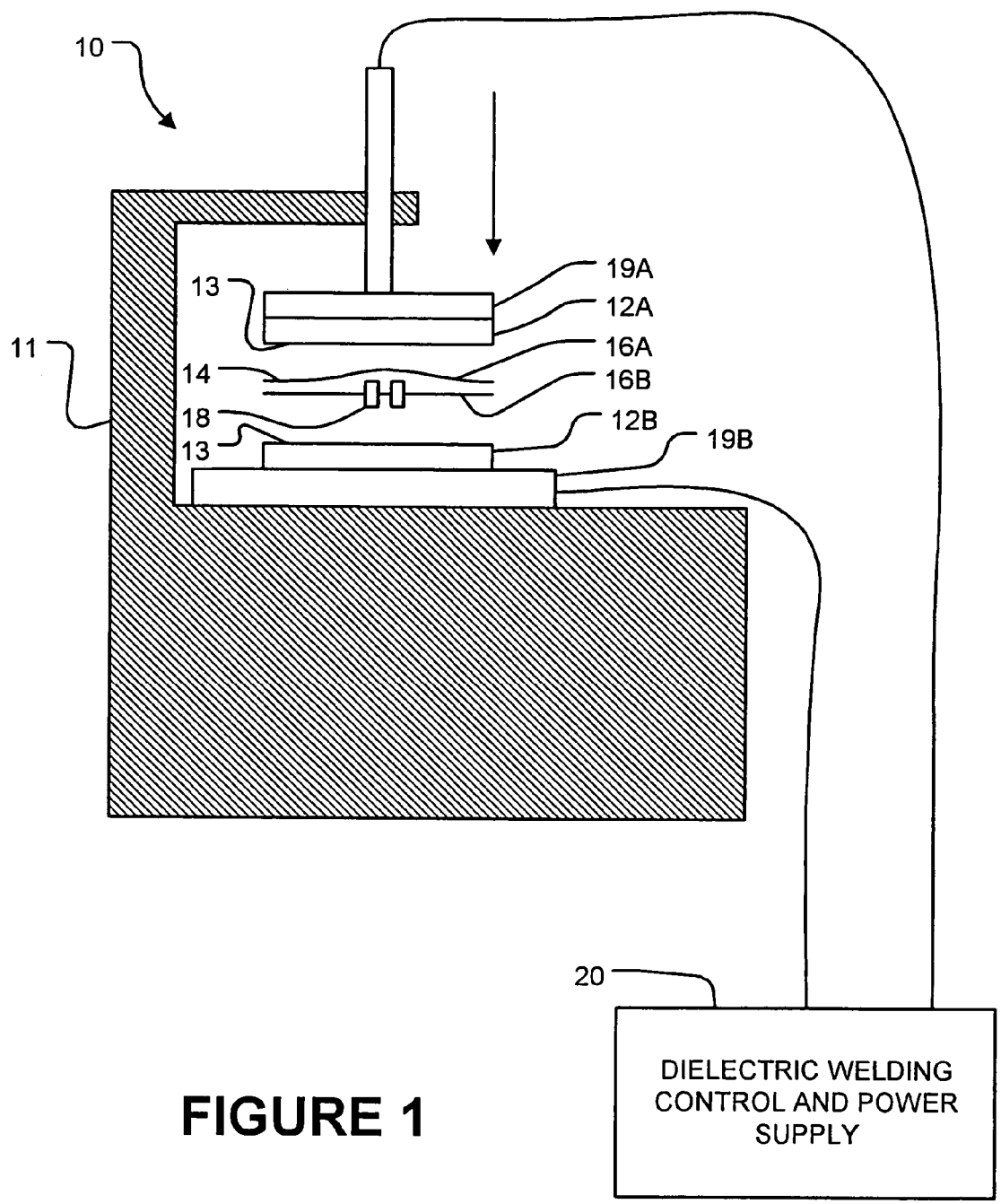
FIG. 1 is a schematic view of a dielectric welding apparatus.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Consider the case where one wishes to create a pattern of welds joining a pair of membranes. The membranes are made of a plastic material which is suitable for dielectric welding. However, one or both of the membranes has attached to it, or embedded in it, one or more electrically conductive elements (ECM). The ECM may, for example, be metal parts. The ECM may be exposed. If the one or more ECM is near to a location in which it is desired to weld the membranes together then the presence of the one or more ECM may interfere with dielectric welding of the membranes together using conventional methods.

Welding methods and apparatus can interpose an electrically insulating barrier between ECM in a product being fabricated and the electrodes of a dielectric welder. Provision of an electrically insulating barrier supports welding non-conductive membranes in close proximity to ECMs.

Electrode structures for dielectric welding may have integrated insulating barriers located so that the insulating barriers will be interposed between electrodes of the electrode structures and the ECMs when the electrodes are in position to make a weld. In some embodiments, the electrode structures include one or more electrodes arranged in a pattern corresponding to a desired weld pattern.

The electrodes may be made of any suitable electrically conducting materials. Aluminum, brass, and copper are examples of materials from which electrodes may be fabricated. The electrodes may be fabricated using any suitable process. For example, the electrodes may be machined, assembled from component parts, cast, etc.

Buffers are located between the electrodes. The buffers are made of electrically insulating materials. The buffers are hollowed out to receive projecting portions of one or more ECMs. In some embodiments the buffers fill the spaces between the electrodes.

The buffers may be made from any of a wide variety of suitable materials. Examples of materials suitable for use as buffers include: electrically non-conductive ceramic materials, polytetrafluoroethylene, polyurethane, polypropylene, polyethylene, silicone, and combinations of these materials. The buffers may be made using any suitable manufacturing processes. For example, the buffers may be machined or otherwise formed from solid materials or cast. A castable polyurethane or silicone may be used to cast all or part of the buffers. The buffers may be partially cast and partially made from solid materials. In preferred embodiments, the buffers have dielectric strengths at least 2 times greater than a dielectric strength of air in a range of frequencies of a high frequency welding current to be used.

FIG. 1 shows schematically a dielectric welding apparatus 10 according to one embodiment of the invention. Apparatus 10 includes first and second electrode assemblies 12A and 12B. Electrode assemblies 12A and 12B are disposed on either side of a product 14 comprising plastic materials, typically membranes 16, to be welded together and one or more ECMs 18. First and second electrode assemblies 12A and 12B each have a face 13 facing toward the other electrode assembly.

Apparatus 10 comprises a frame 11. First electrode assembly 12A is supported by frame 11 and is movable toward and away from second electrode assembly 12B to permit product 14 to be compressed between electrode assemblies 12A and 12B. In some embodiments, electrode assemblies 12A and 12B can be pressed together with a desired force by a mechanical linkage mechanism, a pneumatic or hydraulic mechanism, an electrically controlled actuator or some other suitable pressing means. Electrode assemblies 12A and 12B may be supported by any suitable mechanisms which maintain registration between electrode assemblies 12A and 12B.

In the illustrated embodiment, frame 11 may be the frame of a conventional dielectric welding machine, for example. First electrode assembly 12A is mounted to a first platen 19A. Second electrode assembly 12B is mounted to a second platen 19B. Either or both of the platens are movable to achieve placement of products to be welded and removal of welded products. Apparatus 10 supports the compression, welding, and cool down phases of dielectric welding. As the basic operation and constructions of dielectric welding machines are understood by those skilled in the art, features known from conventional dielectric welding apparatus are not described in detail herein.

First and second electrode assemblies are each connected to a dielectric welding power supply 20. In the illustrated embodiment, the first and second electrode assemblies are in electrical contact with power supply 20 by way of electrical contact between their bases (or non-welding sides) and the corresponding platens 19A, 19B. Except as indicated herein, apparatus 10 may be constructed and operated in substantially the same manner as an existing dielectric welding machine. In operation:

product 14 is compressed between first and second electrode assemblies 12A and 12B;

power supply 20 is operated to supply high frequency dielectric welding current to first and second electrode assemblies 12A and 12B; and, after sheets 16 have had an opportunity to fuse together at the weld locations, the high frequency current is discontinued and, optionally after a cooling interval, first and second electrode assemblies are separated to allow the welded product 14 to be removed.

Figure 2:
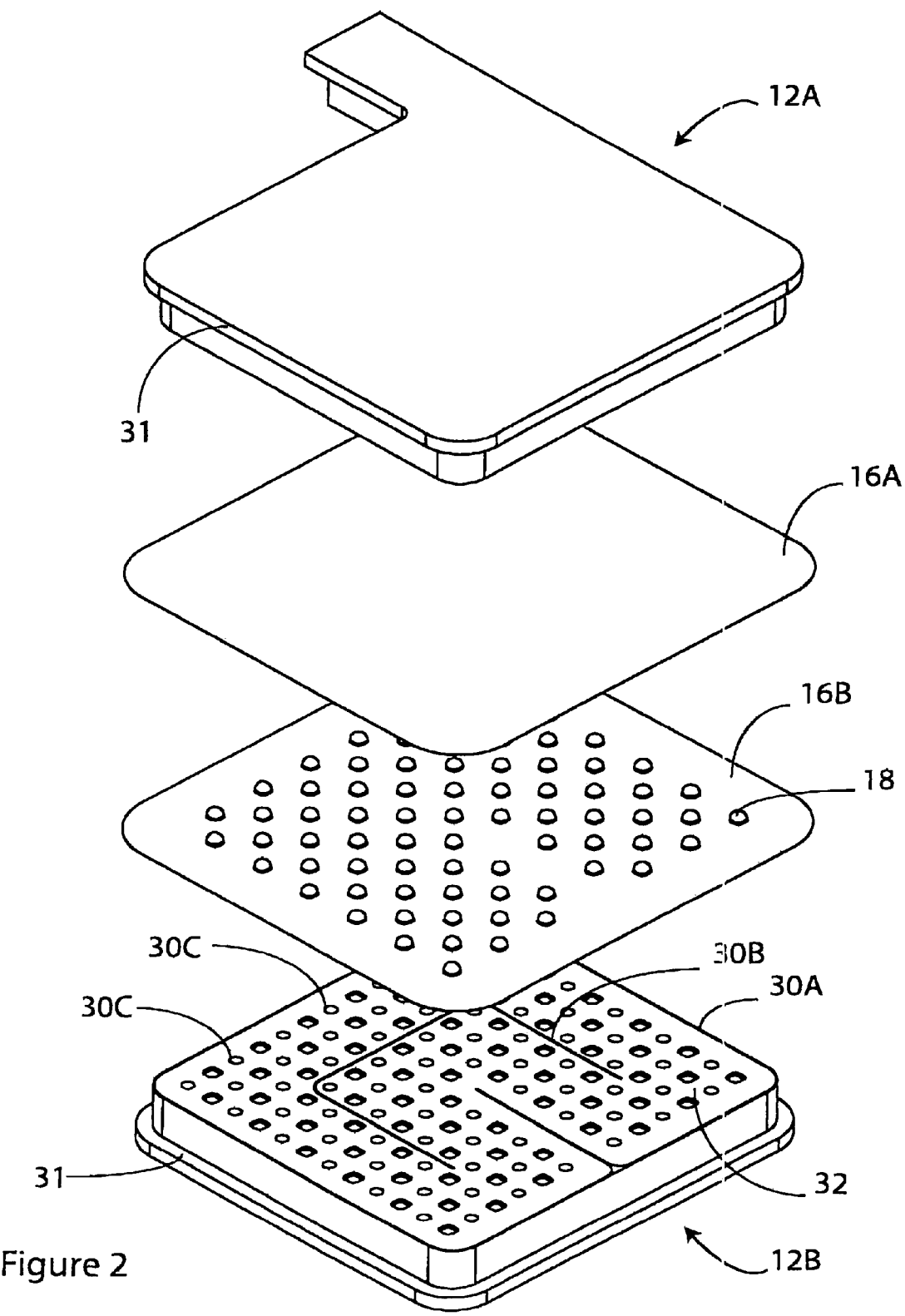
FIG. 2 is an isometric view showing first and second electrode assemblies.
Figure 3:
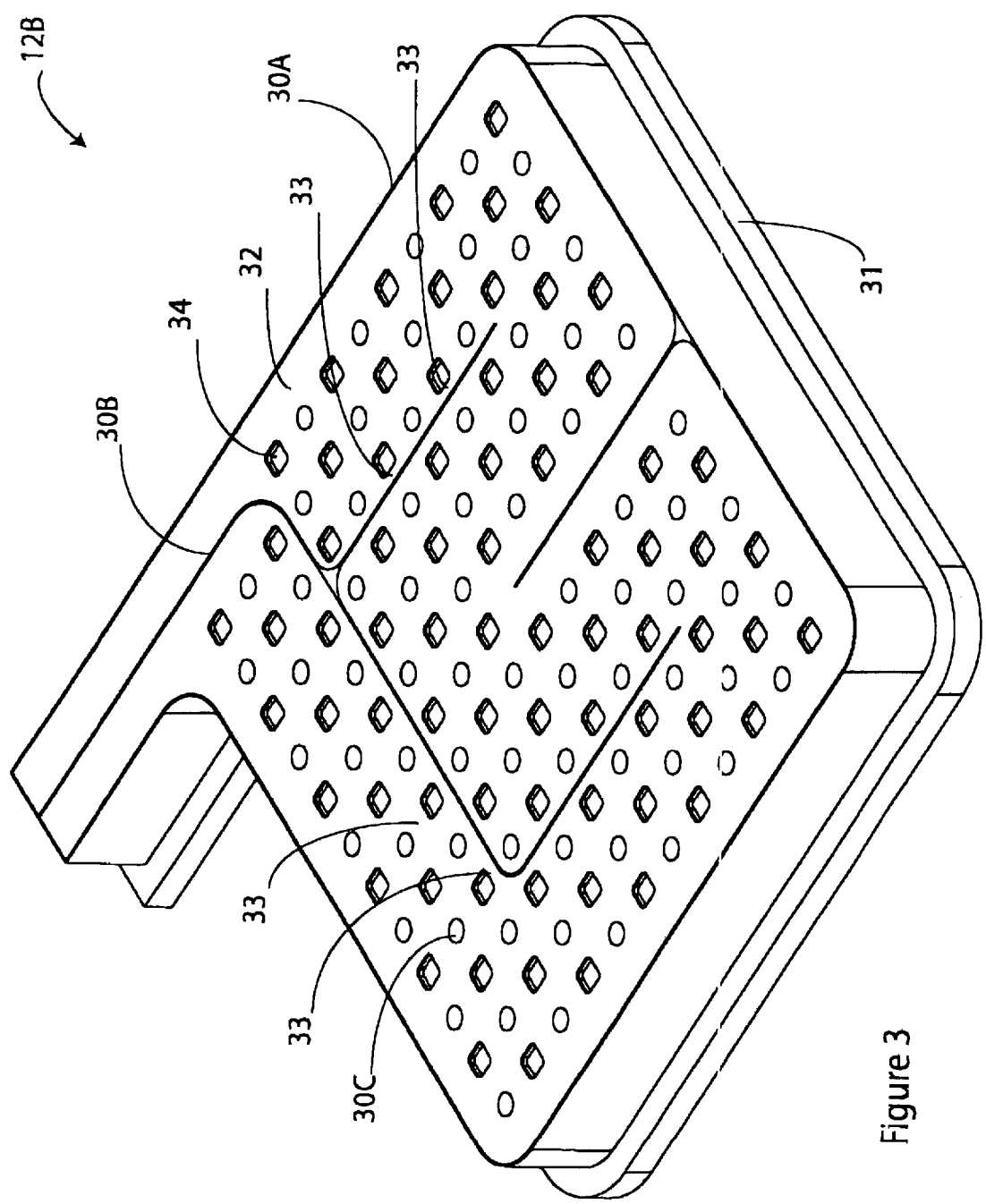
FIG. 3 is a perspective view of one of the electrode assemblies of FIG. 2.

FIG. 2 is an isometric view showing first and second electrode assemblies 12A and 12B according to an example embodiment of the invention. Each electrode assembly 12A and 12B has one or more electrodes 30. Electrodes 30 of first electrode assembly 12A are arranged as a mirror image of electrodes 30 of second electrode assembly 12B. When first and second electrode assemblies 12A and 12B are brought together face-to-face the electrodes 30 of electrode assemblies 12A and 12B follow one another. Electrodes 30 of first and second electrode assemblies 12A and 12B are directly opposed to one another on either side of product 14. The pattern of electrodes 30 defines the pattern of locations at which membranes 16 will be welded together.

In the illustrated embodiment, electrodes 30 include a peripheral electrode 30A which welds a peripheral seam on product 14, internal electrodes 30B which define a pattern of welds in the interiors of products 14, and electrodes 30C which make spot welds on product 14. In the illustrated embodiment, electrodes 30A and 30B are linear electrodes and electrodes 30C are isolated spots. All of the electrodes are electrically connected to an electrically conducting base 33. When first and second electrode assemblies 12A or 12B are mounted to corresponding platens 19A and 19B, bases 33 are in electrical contact with the platens and thereby establish electrical contact between the welding power source 20, which is connected to the platens, and electrodes 30.

The spaces between electrodes 30 are filled with buffer areas 32. In the illustrated embodiment, buffer areas 32 are composed of a cast material 32 cast between electrodes 30.

Buffer areas 32 have recesses 34 to receive the projecting parts of ECMs 18. Recesses 34 may be shaped to substantially conform with the shapes of the projecting parts of ECMs 18. Different ones of recesses 34 may have different shapes and configurations.

Figures 4, 4A:
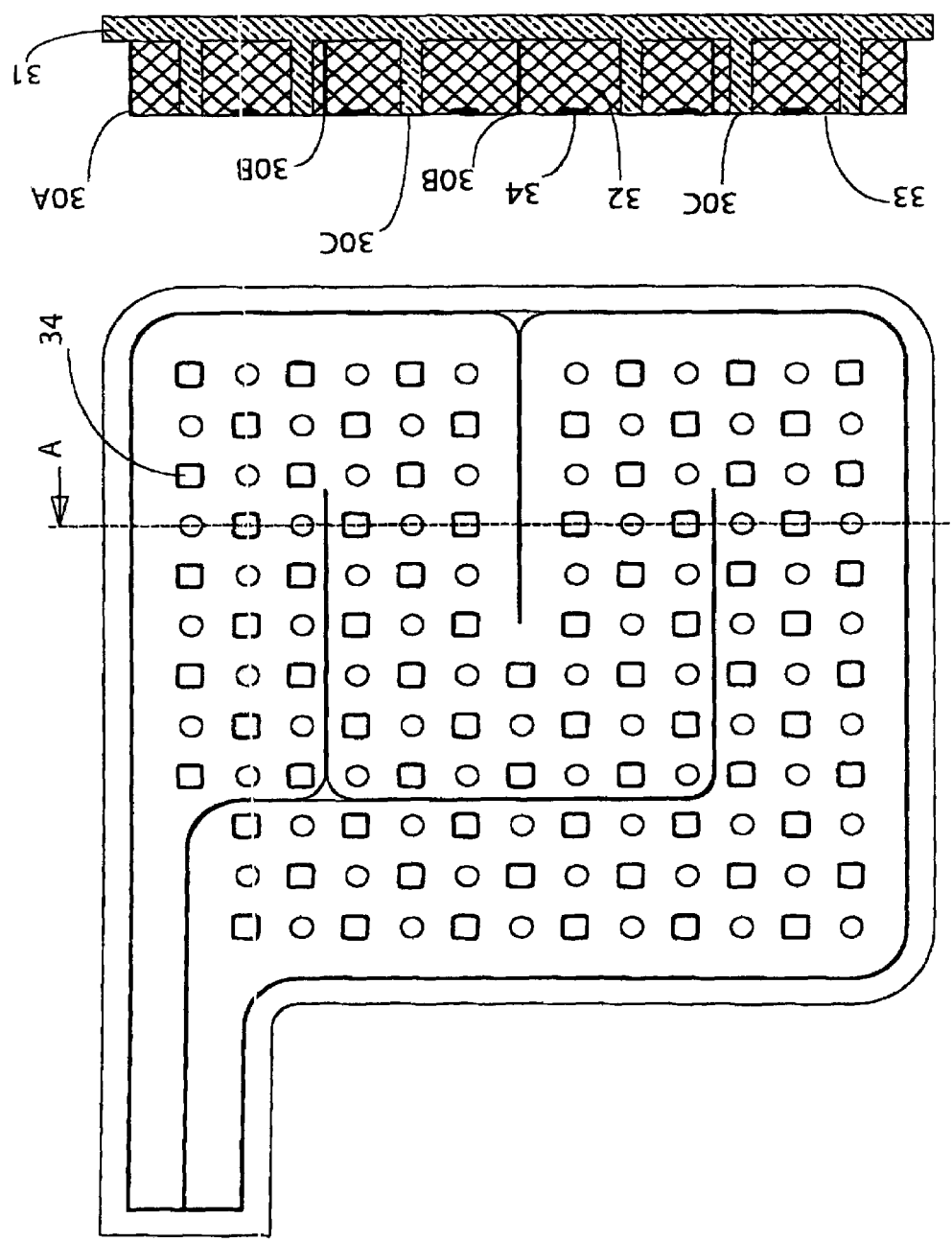
FIG. 4 is a plan view of one of the electrode assemblies of FIG. 2.
FIG. 4A is a cross sectional view (in the plane A—A of FIG. 4) of the electrode assembly of FIG. 4.
Figure 4B:
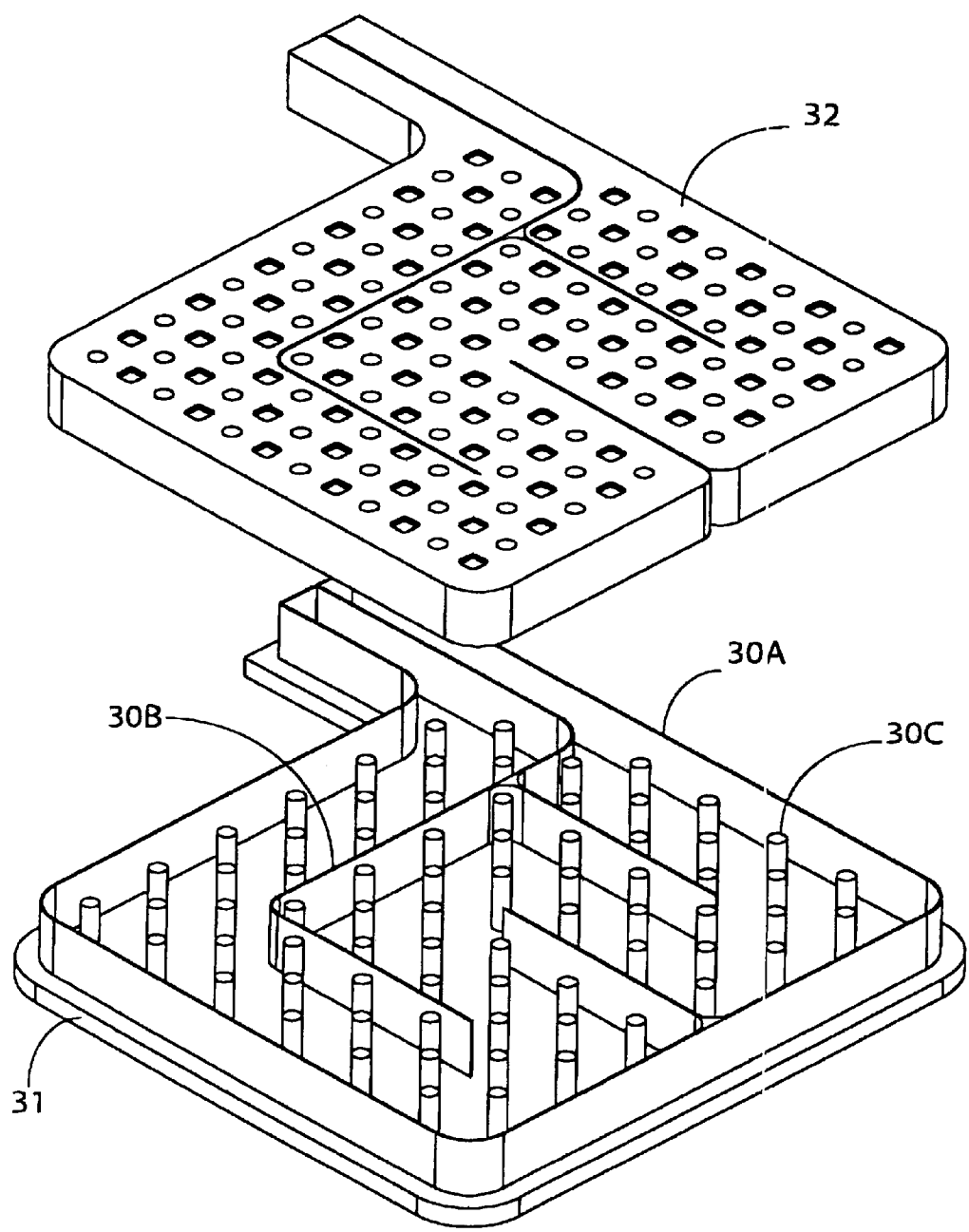
FIG. 4B is an exploded view of the electrode assembly of FIG. 4.
Figure 5:
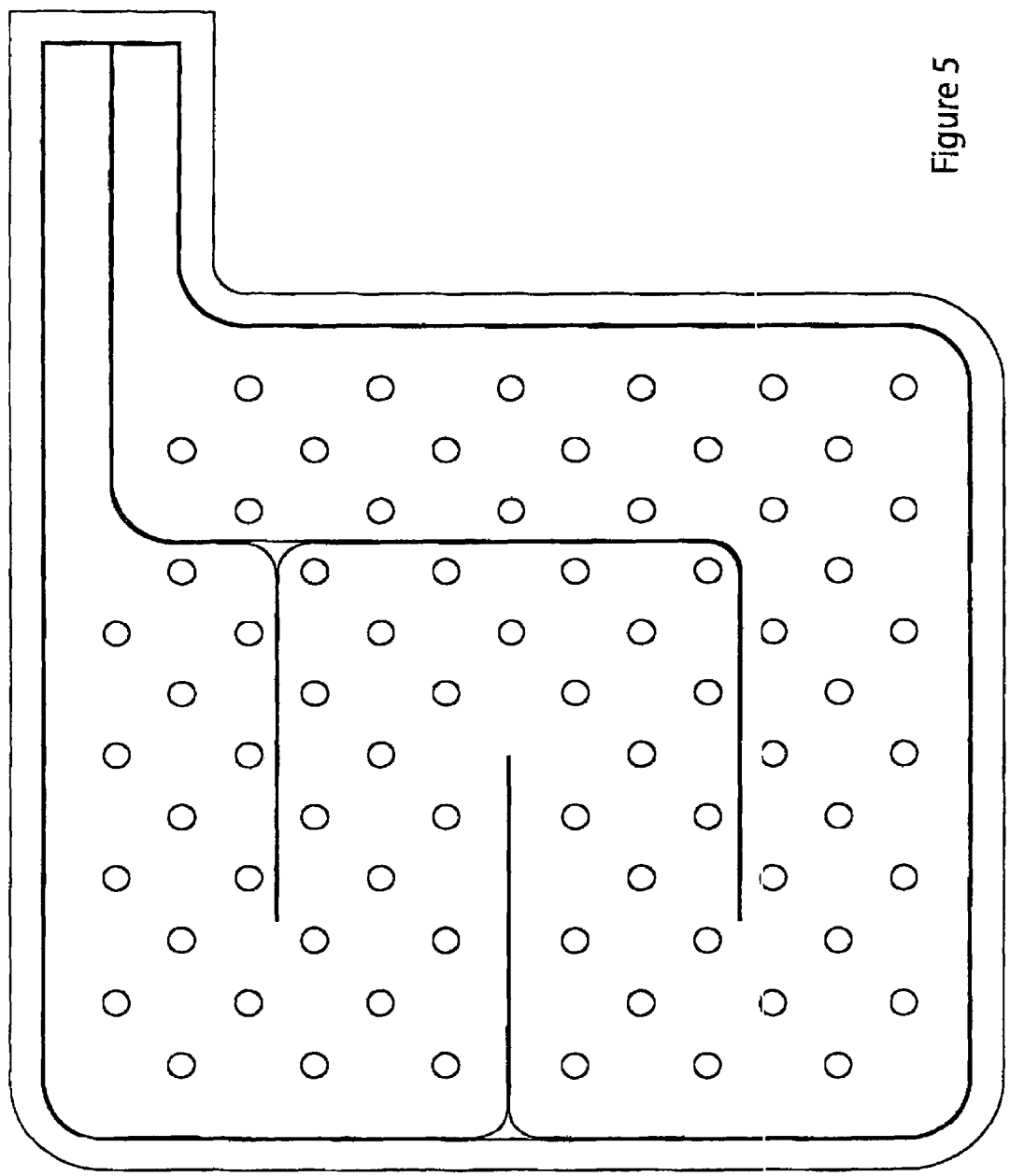
FIG. 5 is a plan view of the other one of the electrode assemblies of FIG. 2.

As shown best in FIG. 4A, buffers 32 fill the space between electrodes 30. Buffers 32 are flush with the tops of electrodes 30. Buffers 32 provide barriers 33 of electrically insulating material between recesses 34 and electrodes 30.

When first and second electrode assemblies are brought together on either side of product 14, the embedded and projecting ECMs 18 are seated in features 34. This insulates ECMs 18 from electrodes 30. Features 34 can also support, locate, and align ECMs 18 in relation to one another and the membranes 16 to be welded.

Buffer areas 32 may optionally contain features to pre-form, locate and pre-align membranes 16 to be welded. Such features may include electrical-mechanical devices and or intermittent differential air pressures or vacuums.

Buffer areas 32 may contain features to assist the ejection and removal of welded membranes with embedded ECM from the major components of the device. Such features could be implemented, for example, by providing electrical-mechanical devices and or intermittent differential air pressures or vacuums.

FIGS. 6 through 13C are more detailed views of portions of example first and second electrode assemblies which cooperate to make a weld.

Figure 6:
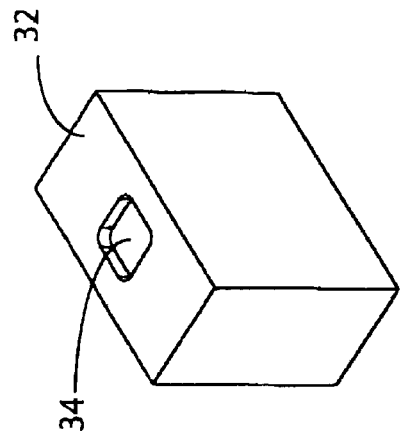
FIG. 6 is an isometric view of a buffer member.
Figure 6C:
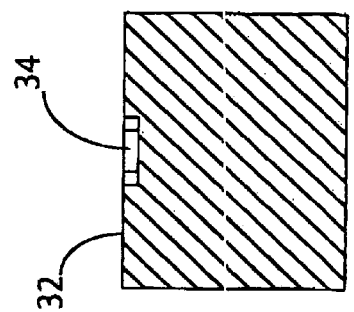
FIG. 6C is a section in the plane B—B thereof.
Figure 6A:
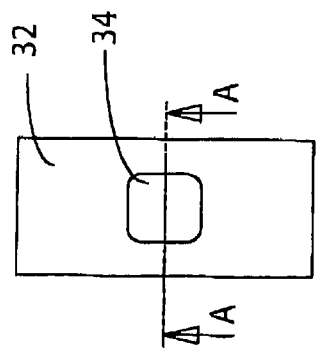
FIG. 6A is a top plan view thereof.
Figure 6B:
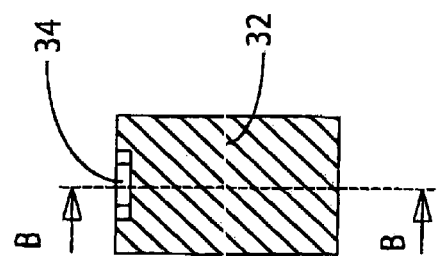
FIG. 6B is a section in the plane A—A thereof.
Figure 7:
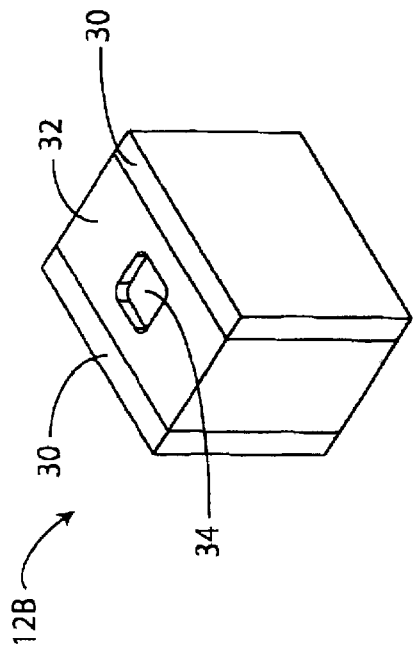
FIG. 7 is an isometric view of a part of an electrode assembly.
Figure 7C:
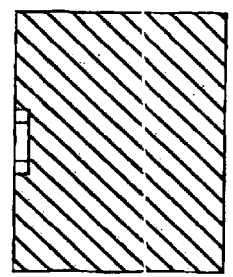
FIG. 7C is a section in the plane D—D thereof.
Figure 7A:
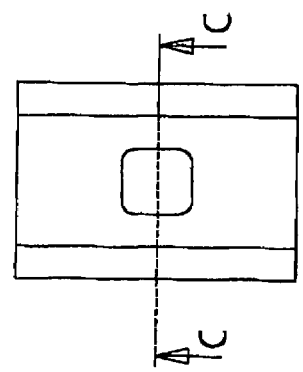
FIG. 7A is a top plan view thereof.
Figure 7B:
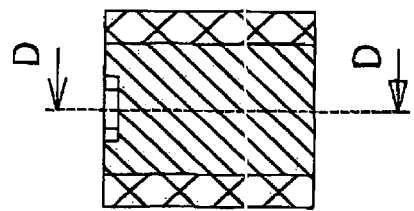
FIG. 7B is a section in the plane C—C thereof.
Figure 8A:
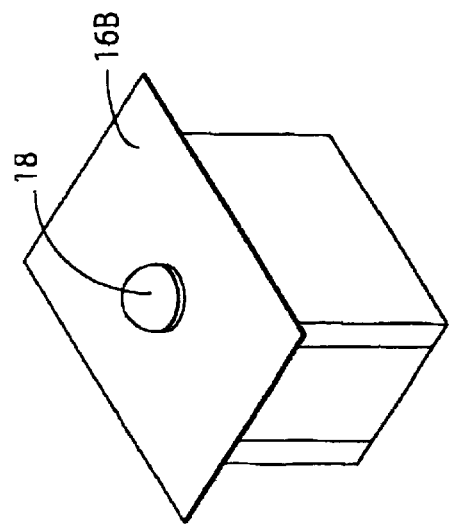
FIG. 8A is a top plan view thereof.
Figure 8:
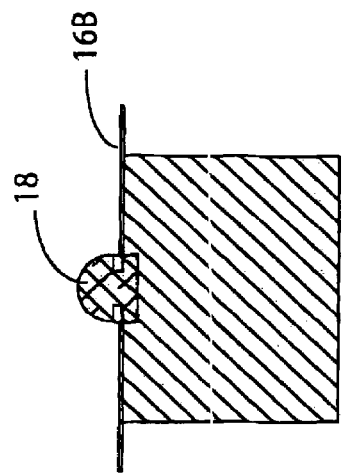
FIG. 8 is an isometric view the electrode assembly of FIG. 7 holding a product to be welded with a top membrane removed for clarity.
Figure 8B:
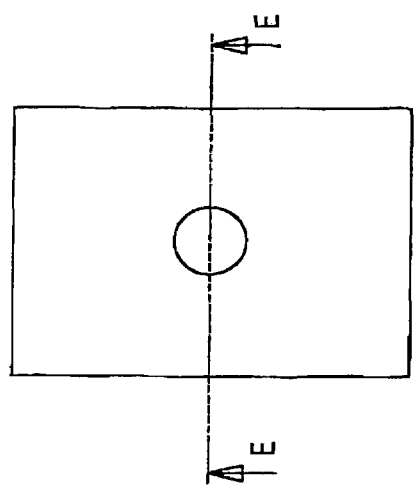
FIG. 8B is a section in the plane E—E thereof.
Figure 8C:
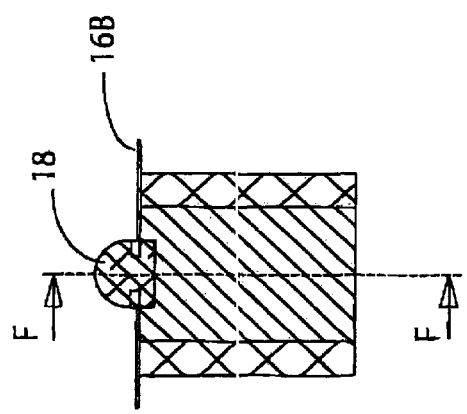
FIG. 8C is a section in the plane F—F thereof.
Figure 9:
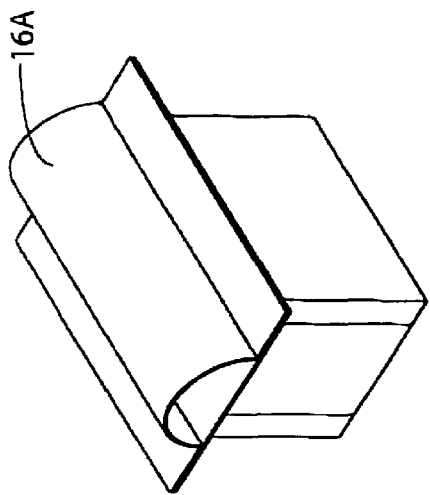
FIG. 9 is an isometric view the electrode assembly of FIG. 8 with the top membrane of the product in place to be welded.
Figure 9C:
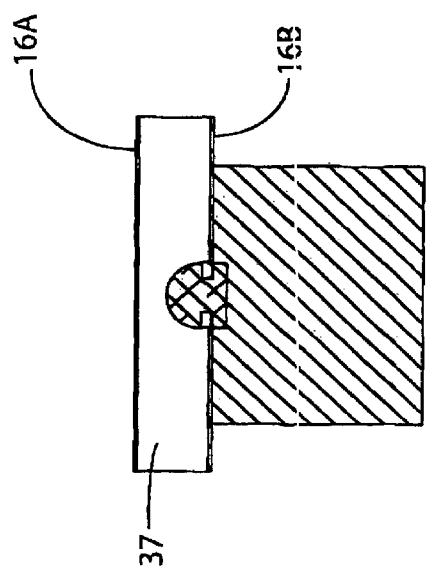
FIG. 9C is a section in the plane H—H thereof.
Figure 9A:
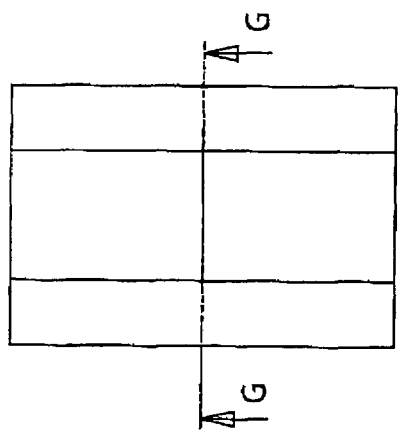
FIG. 9A is a top plan view thereof.
Figure 9B:
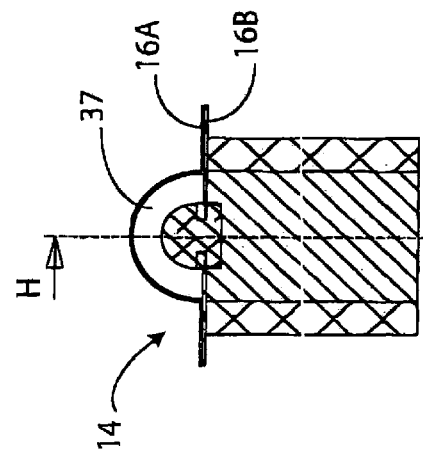
FIG. 9B is a section in the plane G—G thereof.
Figure 10:
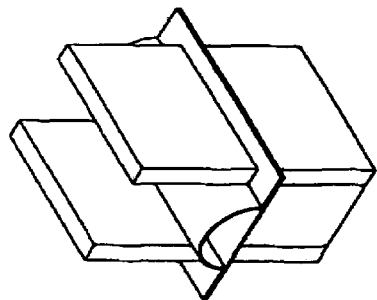
FIG. 10 is an isometric view the electrode assembly of FIG. 9 showing electrodes, but not a buffer portion, of a top electrode assembly.
Figure 10C:
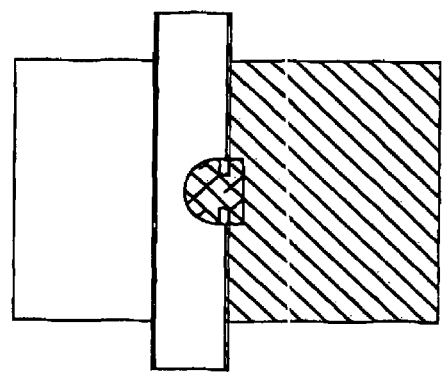
FIG. 10C is a section in the plane J—J thereof.
Figure 10A:
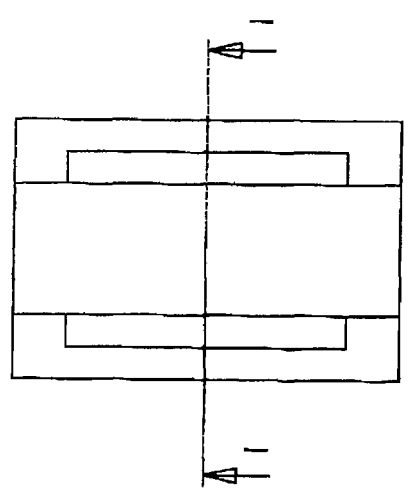
FIG. 10A is a top plan view thereof.
Figure 10B:
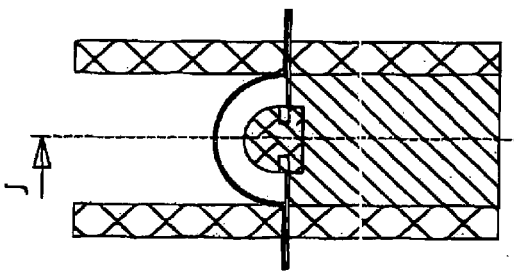
FIG. 10B is a section in the plane I—I thereof.
Figure 11A:
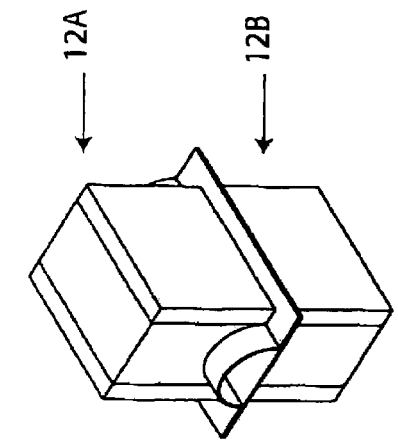
FIG. 11A is a top plan view thereof.
Figure 11:
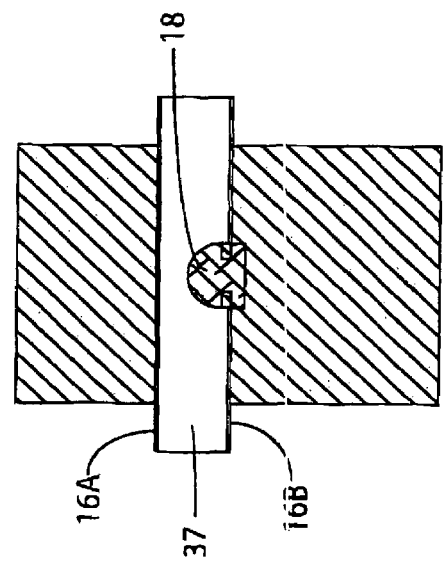
FIG. 11 is an isometric view the electrode assembly of FIG. 10 showing the buffer portion of the top electrode assembly.

FIG. 6 shows a section of buffer material 32 which extends between a pair of electrodes 30 in an electrode assembly 12B as shown in FIG. 7. FIG. 7 shows only a part of electrode assembly 12B. Electrode assembly 12B cooperates with another electrode assembly 12A as shown in FIG. 11. When electrode assemblies 12A and 12B are brought together on either side of a product 14, electrodes 30 of electrode assembly 12A overlie and are aligned with electrodes 30 of electrode assembly 12B.

As shown in FIGS. 8 through 11C, an ECM 18 is received in recess 34 of electrode assembly 12B. ECM 18 is attached to a first membrane 16B of a weldable plastic material. Recess 34 is shaped to generally correspond to the shape of the end of ECM 18 which projects from membrane 16B on the side toward electrode assembly 12B.

As shown in FIGS. 9 through 11C, a second membrane 16A of product 14 is curved away from membrane 16B to provide a tubular passage 37 in product 14. The buffer 32 of first electrode assembly 12A is cut away to form a groove 38 which accommodates and shapes second membrane 16A. Vacuum ports (not shown) may be provided in buffer 32 of second electrode assembly 12A to pull second membrane 16A into and against the contours of groove 38 prior to welding. After welding, the end of ECM 18 which is closest to first electrode assembly 12A is located within passage 37.

Figure 11B:
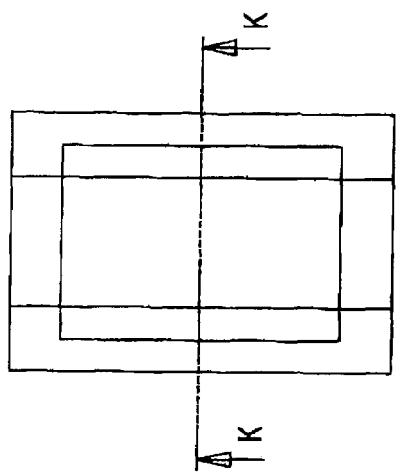
FIG. 11B is a section in the plane K—K thereof.
Figure 11C:
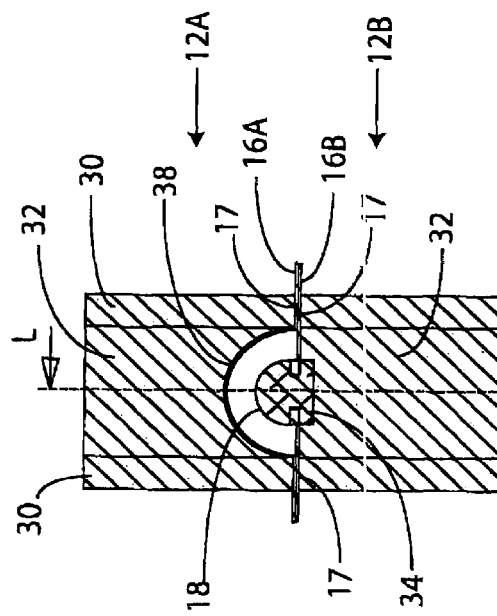
FIG. 11C is a section in the plane L—L thereof.
Figure 12:
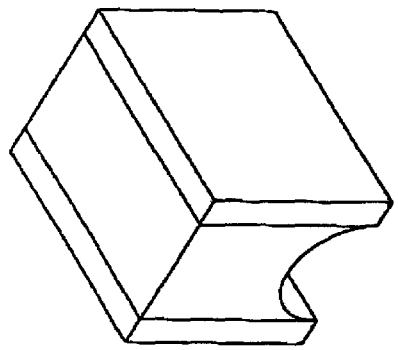
FIG. 12 is an isometric view of the top electrode assembly portion shown in FIG. 11.
Figure 12C:
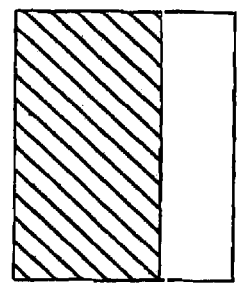
FIG. 12C is a section in the plane N—N thereof; and, FIG. 13 is an isometric view of the top electrode assembly portion shown in FIG. 11 supporting a top membrane of a product.
Figure 12A:
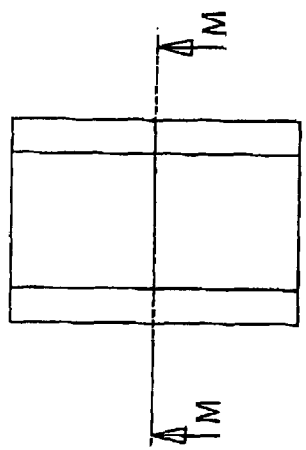
FIG. 12A is a top plan view thereof.
Figure 12B:
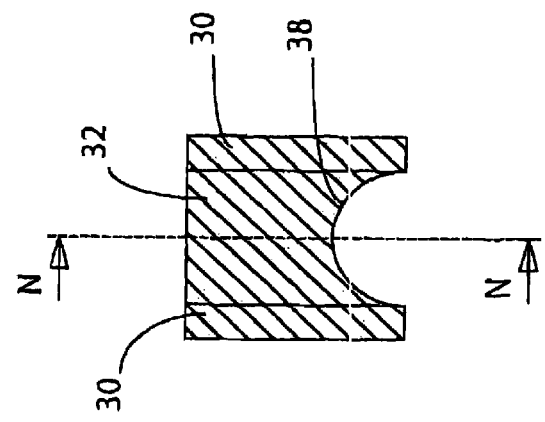
FIG. 12B is a section in the plane M—M thereof.
Figure 13A:
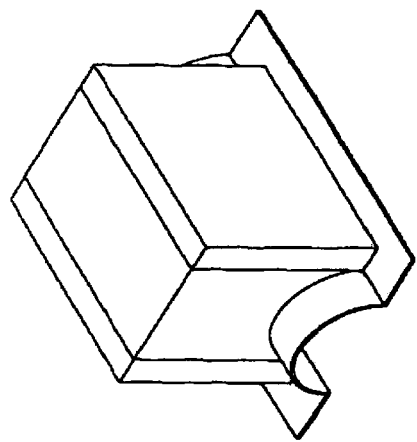
FIG. 13A is a top plan view thereof.
Figure 13:
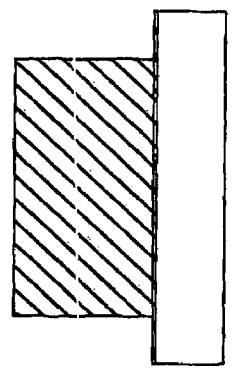
FIG. 13B is a section in the plane O—O thereof.
FIG. 13C is a section in the plane P—P thereof.
Figure 13B:
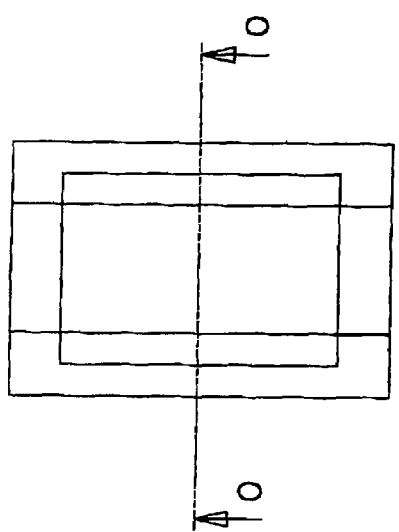
Figure 13C:
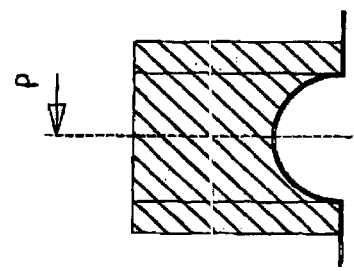

Applying a high frequency alternating welding current between electrodes 30 of first electrode assembly 12A and second electrode assembly 12B causes membranes 16B and 16A to become fused together at locations 17 (FIG. 11B).

Where a component (e.g. a member, part, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Buffers 32 are not necessarily present in areas away from ECMs.

Buffers 32 are present in only one of first and second electrode assemblies in some embodiments of the invention.

The widths of electrodes 30 may be varied.

Electrodes 30 may be arranged to form any suitable pattern.

A welding power supply may be connected directly to electrodes 30 or bases 33 instead of indirectly by way of platens 19A and 19B, as illustrated.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true scope.

What is claimed is:

1. Dielectric welding apparatus comprising:
   first and second opposed electrode assemblies each comprising an arrangement of one or more electrodes, electrodes of the first electrode assembly being complementary to electrodes of the second electrode assembly;
   the first electrode assembly comprising a first volume of an electrically non-conductive buffer material located adjacent to one of the one or more electrodes of the first electrode assembly, the first volume of buffer material having a surface essentially flush with the adjacent electrode, the first volume of buffer material having a recess in the surface for receiving a portion of an electrically conducting member projecting from a first side of a product to be welded.

2. Apparatus according to claim 1 wherein the second electrode assembly comprises a second volume of an electrically non-conductive buffer material located adjacent to one of the one or more electrodes of the second electrode assembly, the second volume of buffer material having a surface essentially flush with the adjacent electrode and a second recess in the surface that is aligned with the recess in the first volume of buffer material when the complementary electrodes of the first and second electrode assemblies are aligned with one another.

3. Apparatus according to claim 1 wherein the first volume of buffer material fills spaces between the electrodes of the first electrode assembly.

4. Apparatus according to claim 3 wherein the second volume of buffer material fills spaces between the electrodes of the second electrode assembly.

5. Apparatus according to claim 1 wherein the product comprises a membrane, at least one of the electrode assemblies has a recessed portion that is recessed away from the other one of the electrode assemblies and the apparatus comprises a means for urging the membrane of the product into the at least one recessed portion.

6. Apparatus according to claim 5 wherein the means for urging a membrane of the product into the at least one recessed portion comprises one or more apertures in the recessed portion that are connectible to a source of suction.

7. Apparatus according to claim 1 wherein the electrodes of the first electrode assembly are arranged as a mirror image of the electrodes of the second electrode assembly.

8. Apparatus according to claim 1 wherein the first and second electrode assemblies respectively include complementary first and second peripheral electrodes.

9. Apparatus according to claim 8 wherein the recess in the first volume of buffer material is located within an area that is substantially circumscribed by the first peripheral electrode.

10. Apparatus according to claim 9 wherein the first electrode assembly comprises one or more internal electrodes lying within the area that is substantially circumscribed by the first peripheral electrode and the second electrode assembly comprises one or more internal electrodes lying within an area that is substantially circumscribed by the second peripheral electrode wherein the internal electrodes of the second electrode assembly are complementary to the internal electrodes of the first electrode assembly.

11. Apparatus according to claim 1 wherein the electrodes of the first and second electrode assemblies comprise one or more linear electrodes defining lines of welding.

12. Apparatus according to claim 1 wherein the electrodes of the first electrode assembly are electrically connected to an electrically-conducting base.

13. Apparatus according to claim 1 wherein the recess in the first volume of buffer material is shaped to substantially conform with the shape of a projecting part of an electrically conducting member.

14. Apparatus according to claim 1 wherein the first volume of buffer material has an array of recesses in the surface, each recess in the array spaced apart from the most closely adjacent parts of the electrodes of the first electrode assembly by a thickness of the buffer material.

15. Apparatus according to claim 1 wherein the recess in the first volume of buffer material is substantially hemispherical.

16. Apparatus according to claim 1 comprising a power supply providing a high frequency welding current wherein the buffer material comprises a material having a dielectric strength at least 2 times greater than a dielectric strength of air in a range of frequencies of the high frequency welding current.

17. Apparatus according to claim 1 wherein the first electrode assembly has at least one groove formed in a face thereof and one or more vacuum ports are provided in the groove.

18. Apparatus according to claim 1 wherein the buffer material is selected from the group consisting of: electrically non-conductive ceramic materials, electrically non-conductive polymer materials; polytetrafluoroethylene, polyurethane, polypropylene, polyethylene, silicone, and combinations of these materials.

19. Apparatus according to claim 1 comprising means for pressing the first and second electrode assemblies together on opposing sides of a product to be welded.

* * * * *